(No Model.)

E. L. DRAKE.
ICE CREAM FREEZER.

No. 458,543. Patented Aug. 25, 1891.

Witnesses

Inventor
Edwin L. Drake.
By his Attorney

UNITED STATES PATENT OFFICE.

EDWIN L. DRAKE, OF WINCHESTER, TENNESSEE.

ICE-CREAM FREEZER.

SPECIFICATION forming part of Letters Patent No. 458,543, dated August 25, 1891.

Application filed November 12, 1890. Serial No. 371,187. (No model.)

*To all whom it may concern:*

Be it known that I, EDWIN L. DRAKE, a citizen of the United States, and a resident of Winchester, in the county of Franklin and State of Tennessee, have invented certain new and useful Improvements in Ice-Cream Freezers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to devices for cooling liquid substances, and more particularly to such description of such devices as are known as "ice-cream freezers," the object being to so improve the devices of this class as to render them more economical and convenient of operation, to improve the product, and to provide storage for same at a sufficiently-low temperature to preserve it for a reasonable length of time after removing from the cylinder, all of which is performed by devices by which all danger of metallic poisoning is obviated, the details of all of which are hereinafter fully described, and the points of novelty claimed.

Figure 2:
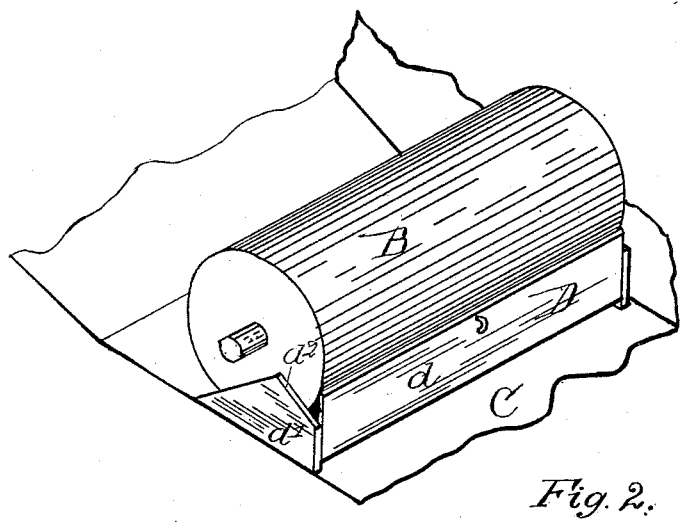
Figure 1:
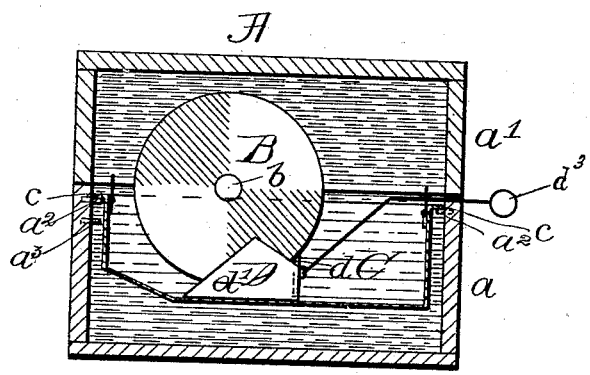

In the accompanying drawings, Figure 1 is a view of the interior of the device, one side of the casing being removed in order to show said interior, the devices within the pan being shown by removing one side thereof. Fig. 2 is a view in perspective of the floor of the pan, showing the relative position of the cylinder thereto, and also a view of the scraper contacting with the exterior of the cylinder both as to peripheral and end surfaces.

In these figures like reference-marks indicate corresponding parts in all the views.

The casing A is composed of two parts, a lower section and an upper or cover section, which are made practically air-tight, with the exception of some small apertures, hereinafter described, which apertures are made to fit as closely as possible the articles operating therein. Suspended and revolving within this casing A, by means of bearings on the journals $b$, is a cylinder B. These journals $b$ run in suitable notches in the section $a$ of the casing, suitable notches being cut in the section $a'$ to fit down over the said journals $b$. The cylinder B is of plate-tin of the desired thickness, made water-tight, and is adapted to hold the refrigerant mixture, which is introduced through one of the journals $b$, which is made hollow, and, if necessary, enlarged for the purpose. Said tubular bearing may be closed against the outflow of the refrigerant by means of a cork, a rubber-packed screw-cover, or otherwise, as desired. A hand-crank is attached to the small journal, by means of which the cylinder B is caused to revolve.

The pan C is for the purpose of containing the cream, and for that reason is hung within the casing in such a position that the cylinder B will revolve in the contents to the desired depth and so gather the film of cream to be frozen. This pan C is provided for purposes of suspension with flanges $c$, extending partly or completely around the top thereof, and the inner side of the lower half of the casing has pins $a^2$ projecting therefrom, with which the flange or flanges $c$ engage. A supplementary row of pins $a^3$ are inserted on either or both sides of the casing below the pins $a^2$, so that as soon as the cream is frozen one end of the pan C may be lowered by springing the side thereof that carries the flange inwardly and allowing the flange to pass over the row of pins $a^2$, allowing it to spring outwardly afterward as the pan is lowered in time to engage with the row of pins $a^3$, by reason of which the cream remaining in the pan will flow to one end thereof, from which it can be gathered by the cylinders and be frozen thereon. This construction is also advantageous for draining any meltage from the frozen cream after removal from the cylinder, which will be better understood after further description of the device.

The scraper D is composed of a blade $d$, having secured at approximately right angle thereto on each end guides $d'$, the whole being so arranged that the said guides $d'$ will rest on the bottom of the pan C and the top edge of the blade will rest against the peripheral surface of the cylinder and have between its bottom edge and the pan a slight space for the drainage of any cream becoming liquid after being scraped from the cylinder by the scraper D, allowing said liquid cream to flow down the bottom to the lower end of the pan, said end being lowered by placing the flange of the pan on the pins $a^3$. The edges $d^2$ of the guides $d'$ are substantially radial to the cylinder when in position, and at all times, whether the blade $d$ is in contact with the peripheral surface of the cylinder or not, contact with the end surfaces thereof and prevent the accretion of cream on said ends, thus confining the cream to its legitimate space and preventing said cream from contacting with the journal-bearings $b$, which are preferably of galvanized iron, and hence when acted upon by any acid in the cream are liable to form active metallic poisons. This construction, however, absolutely insures against the cream contacting with said bearings during operation.

The scraper D is preferably of some hard wood which has very little, if any, taste or odor, the blade $d$ being made preferably quite thick, in order that it may have a long face substantially parallel to the periphery of the cylinder, and hence "rub the cream" and render it smooth, taking off a shaving of cream of a thickness governed by the pressure exerted on the handle $d^3$, which passes through a small notch in the casing and engages with the scraper D by means of a staple or other suitable construction.

The operation of this device is as follows: The cylinder B is filled with a refrigerating-mixture of the desired kind and in the requisite quantity for the amount of cream to be frozen and stored and the pan C filled to the desired depth with the unfrozen cream, after which the end of the pan in which the cylinder B is placed is lowered, the operator in doing so taking hold of the rings at each end of the pan, and by springing in the flange thereby on the end to be lowered, passing it over the pin $a^2$, and allowing it to spring back and engage with the pins $a^3$, after which the cylinder B is placed in position upon its bearings in the notches in the part $a$ of the casing, and by means of the rod $d^3$ the scraper D is withdrawn from contact with the peripheral surface of the cylinder. The cylinder is then revolved at the desired speed, thoroughly mixing the refrigerant within the cylinder and keeping the cream agitated and its constituent elements thoroughly mixed, the refrigerant causing an accretion of cream upon the peripheral surface of the cylinder, the edge $d^2$ of the scraper D preventing the accretion thereof on the end surface of the cylinder. If desired, the pan may now be raised to a horizontal position and the remainder of the cream frozen on the cylinder, after which the pan is again lowered and the scraper D pressed against the periphery of the frozen cylinder of cream and the same thereby removed in thin shavings or thick, as desired, the edge of the scraper $d$ rubbing the surface of the said cream and so working it to an extremely smooth consistency. The cream will thus remain in the division of the pan for frozen cream until it is used or the refrigerant expended, any meltage running into the lower end of the pan C through the aperture under the scraper $d$.

By reason of their being no apertures in the casing the cream may be held therein in a frozen state so long as the refrigerant is active. It is thus obvious that the entire efficiency of the ice will be utilized in the absorption of heat from the air within the freezer and the cream will be kept frozen thereby until served.

Having described my invention, what I claim as new, and desire to secure by Letters Patent, is—

1. In an ice cream freezer, the combination of the pan, the scraper partially dividing the pan into two compartments, in one of which is carried the cream before it is frozen and in the other the frozen cream, and the cylinder carrying a refrigerant and adapted to rotate in the compartment carrying the unfrozen cream, substantially as and for the purpose specified.

2. In an ice-cream freezer, the combination of the pan, the scraper partially dividing the pan into two compartments adapted to hold, respectively, the frozen and the unfrozen cream, the cylinder rotating in the compartment for the unfrozen cream, and the side scrapers attached to the ends of the main scraper, having edges within a short distance of the ends of the cylinder, substantially as described.

3. In an ice-cream freezer, the combination of the pan, the adjustable scraper partially dividing the pan into two compartments, the side scrapers attached to the ends of the main scraper and elevating the same, so as to leave an opening between the two compartments beneath the said main scraper, and a cylinder carrying a refrigerant and rotating in one of the said compartments, substantially as described.

4. In an ice-cream freezer, the combination, with the close inclosing casing, of the revoluble cylinder for holding the refrigerant material, a pan within the said casing for holding the material to be frozen, and a scraper for removing the frozen material from the surface of the cylinder and discharging it into said pan, said scraper being supported by said pan and movable toward and from said cylinder in the plane of the pan, substantially as described.

5. In an ice-cream freezer, the combination, with the close inclosing casing, of a removable cylinder for holding a refrigerant material, a vertically-adjustable pan within the casing for holding the material to be frozen, and an adjustable scraper supported by and discharging into said pan, substantially as described.

6. In an ice-cream freezer, the combination, with the close inclosing casing, of a revoluble cylinder for holding a refrigerant material, a pan beneath said cylinder, and a movable scraper for said cylinder supported by and discharging into said pan, said scraper having a handle extending outside of said casing, substantially as described.

7. In an ice-cream freezer, the combination, with the casing, of a revoluble cylinder for containing a refrigerant material, a pan for containing the material to be frozen, a scraper partially dividing the pan into two compartments, and a handle for moving said scraper extending outside of said casing, substantially as described.

8. In an ice-cream freezer, the combination, with the casing, of a pan adjustable vertically at one side without moving the opposite side, and a revoluble cylinder for holding a refrigerant material mounted nearer one side of said pan than the other, whereby the material to be frozen can be deepened beneath said cylinder, substantially as described.

9. In an ice-cream freezer, the combination, with the inclosing casing, of a pan adjustable in a vertical direction at one side independently of the other, a revoluble cylinder for holding a refrigerant material mounted nearer one side of the pan than the other, and a movable scraper dividing said pan, substantially as described.

10. In an ice-cream freezer, the combination, with a casing and cylinder for the refrigerant material, of the pan for holding the material to be frozen, and the scraper movably mounted within said casing and having a handle secured thereto, said handle extending outside of the casing and lying loosely in an aperture in the casing, whereby said scraper can be quickly pressed against the cylinder or withdrawn from engagement with the same, substantially as described.

In testimony whereof I hereunto affix my signature in presence of two witnesses.

EDWIN L. DRAKE.

Witnesses:
B. CLEAVELAND,
J. A. TURNER.

It is hereby certified that in Letters Patent No. 458,543, granted August 25, 1891, upon the application of Edwin L. Drake, of Winchester, Tennessee, for an improvement in "Ice-Cream Freezers," an error appears in the printed specification requiring correction, as follows: In lines 34-35, page 3, the words " secured thereto" should be stricken out; and that the said Letters Patent should be read with this correction therein to make the same conform to the record of the case in the Patent Office.

Signed, countersigned, and sealed this 1st day of September, A. D. 1891.

[SEAL]                                CYRUS BUSSEY,
*Assistant Secretary of the Interior.*

Countersigned:

N. L. FROTHINGHAM,
      *Acting Commissioner of Patents.*